(12) United States Patent
Tran et al.

(10) Patent No.: US 9,422,971 B2
(45) Date of Patent: Aug. 23, 2016

(54) SWIVEL DEVICE

(71) Applicants: Thanh-Tuan Tran, Franfurt (DE); Detlev Ulle, Ostheim (DE)

(72) Inventors: Thanh-Tuan Tran, Franfurt (DE); Detlev Ulle, Ostheim (DE)

(73) Assignee: DE-STA-CO Europe GmbH, Oberursel (DE)

(*) Notice: Subject to any disclaimer, the term of this patent is extended or adjusted under 35 U.S.C. 154(b) by 0 days.

(21) Appl. No.: 13/824,076

(22) PCT Filed: Jan. 8, 2013

(86) PCT No.: PCT/DE2013/100002
§ 371 (c)(1),
(2) Date: Mar. 15, 2013

(87) PCT Pub. No.: WO2013/104355
PCT Pub. Date: Jul. 18, 2013

(65) Prior Publication Data
US 2014/0321903 A1 Oct. 30, 2014

(30) Foreign Application Priority Data
Jan. 11, 2012 (DE) .................. 10 2012 100 186

(51) Int. Cl.
*B23Q 1/52* (2006.01)
*F16C 11/04* (2006.01)
*B25B 5/16* (2006.01)

(52) U.S. Cl.
CPC . *F16C 11/04* (2013.01); *B25B 5/16* (2013.01); *B25B 5/163* (2013.01); *Y10T 403/32557* (2015.01)

(58) Field of Classification Search
CPC .......... B23Q 1/52; B23Q 1/54; B23Q 16/001; Y10T 403/32557; Y10T 403/32591; Y10T 403/32861; Y10T 403/32918
See application file for complete search history.

(56) References Cited

U.S. PATENT DOCUMENTS

| 3,783,746 | A | * | 1/1974 | Jacobellis | ............... | 92/121 |
| 5,171,001 | A | * | 12/1992 | Sawdon | ................ | 269/32 |
| 5,634,629 | A | * | 6/1997 | Blatt | ................ | 269/32 |
| 6,070,864 | A | * | 6/2000 | Crorey | ................ | 269/32 |
| 6,488,273 | B2 | * | 12/2002 | Sawdon et al. | ................ | 269/20 |
| 2002/0153650 | A1 | | 10/2002 | Sawdon et al. | | |

FOREIGN PATENT DOCUMENTS

| DE | 20214887 U1 | 2/2003 |
| DE | 60203577 T2 | 1/2006 |
| DE | 202008013025 U1 | 1/2009 |
| EP | 1952946 A2 | 8/2008 |

* cited by examiner

*Primary Examiner* — Michael P Ferguson
(74) *Attorney, Agent, or Firm* — Harness, Dickey & Pierce, P.L.C.

(57) ABSTRACT

A swivel device has a swivel shaft (2) rotatably mounted in a housing. A portion of the swivel shaft (2) projects from the housing (1). A swivel lever (3) is fixably mounted on the shaft (2) and is swivelable relative to the housing (1). The swivel lever (3) is arranged outside the housing (1). A first part (4) of a stop is arranged externally on the housing (1). A second part (5) of the stop is connected with the swivel lever (3). The first (4) and second (5) parts of the stop form a rotational movement stop for the swivel lever (3). The second part (5) of the stop is detachable from the swivel lever (3) and is reattachable to the swivel lever (3) in various positions on the swivel lever (3).

15 Claims, 4 Drawing Sheets

SWIVEL DEVICE

FIELD

The disclosure relates to a swivel device, and, more particularly, to a swivel device that has first and second stop parts that form a rotational movement stop for a swivel lever. The second stop part is detachable from the swivel lever and is reattachable to the swivel lever in various positions on the swivel lever.

BACKGROUND

A swivel device is known in the art from DE 202 14 887 U1. Here a swivel shaft is rotatably mounted in a housing and projects from the housing. A swivel lever is mounted on the shaft and can be swivelled relative to the housing. The swivel lever is arranged outside the housing such that it cannot rotate relative to the shaft. A first part of a stop is arranged externally on the housing. A second part of the stop is connected with the swivel lever. A rotational movement stop is provided for the swivel lever. Such a swivel device has proved to work well in practice. As can be seen from the figures, the rotational movement stop of this solution can be finely adjusted via an adjusting screw on the first part of the stop. In the interests of completeness reference is also made to the documents DE 602 03 577 T2 and DE 20 2008 013 025 U1.

SUMMARY

It is an object of the present disclosure to improve the flexibility and adjustability of a swivel device.

The object is achieved by a swivel device that comprises a swivel shaft rotatably mounted in a housing and that projects from the housing. A swivel lever is fixably mounted on the shaft and is swivelable relative to the housing. The swivel lever is arranged outside the housing. A first part of a stop is arranged externally on the housing. A second part of the stop is connected with the swivel lever. The first and second parts of the stop form a rotational movement stop for the swivel lever. The second part of the stop is detachable from the swivel lever and is reattachable to the swivel lever in various positions on the swivel lever.

In accordance with the disclosure, the second part of the stop is designed to be detachable from the swivel lever for purposes of adjusting the rotational movement stop. The second part of the stop may be reattached in various positions on the swivel lever.

In other words, the adjustability of the rotational movement stop can now be implemented not only via movement of the first part of the stop, but additionally via movement of the second part of the stop. This significantly increases the flexibility of the swivel device as will be illustrated in more detail in the following.

Further, in accordance with the disclosure, the second part of the stop is a flat plate with a projection that interacts with the first part of the stop. The second part of the stop is either a circular disk, or a ring, with a nose-shaped projection. The swivel lever includes threaded holes. The second part of the stop includes through holes that are at least partly aligned with the threaded holes. The swivel lever and the second part of the stop are connected with one another via screws that pass through the through holes and engage in the threaded holes.

Further, in accordance with the disclosure, the first part of the stop is arranged on the housing to prevent a rotational movement of the swivel lever in a first rotational direction. An additional first part of the stop is provided on the housing. The additional first part of the stop interacts with an additional second part of the stop attached to the swivel lever. The additional first and second parts of the stop prevent a rotational movement of the swivel lever in a second rotational direction. The first part of the stop and the additional first part of the stop are arranged as a common stop block externally on the housing.

The swivel device further comprises a first opening is provided on the swivel lever. The first opening is a form fit accommodation for the swivel shaft. A second opening is provided in the swivel lever for a clamping element. The clamping element is adjustable relative to the swivel lever. The clamping element can be tensioned against a flank of the swivel shaft. At least one tensioning screw is provided to tension the clamping element against the swivel shaft. The tensioning screw can be actuated from outside the swivel lever. The swivel shaft projects outward on either side of the housing. The swivel lever is formed from two swivel arms arranged on either side of the housing. In each case, the swivel arms are connected with the swivel shaft and with one another, via a mounting plate. Each swivel arm includes two arm parts that can be securely connected with one another in various positions. The arm parts in each case have a hole pattern with through holes and threaded holes. The through holes and threaded holes are at least partly aligned with one another in various positions. The holes are connected with one another with screws.

A first reference element is provided on the nose-shaped projection of the part on the second part of the stop and/or on the additional second part of the stop. The reference element is aligned in a certain rotational position of the swivel shaft with a second reference element arranged on the housing. The reference elements can be fixed relative to one another so as to prevent a rotational movement of the swivel shaft. The first reference element is a through hole with a thread. The second reference element is a hole, preferably with a thread. A screw connects the first and second reference elements.

The inventive swivel device, including its advantageous developments, is elucidated in more detail in what follows on the basis of the figurative representation of various examples of the embodiments.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
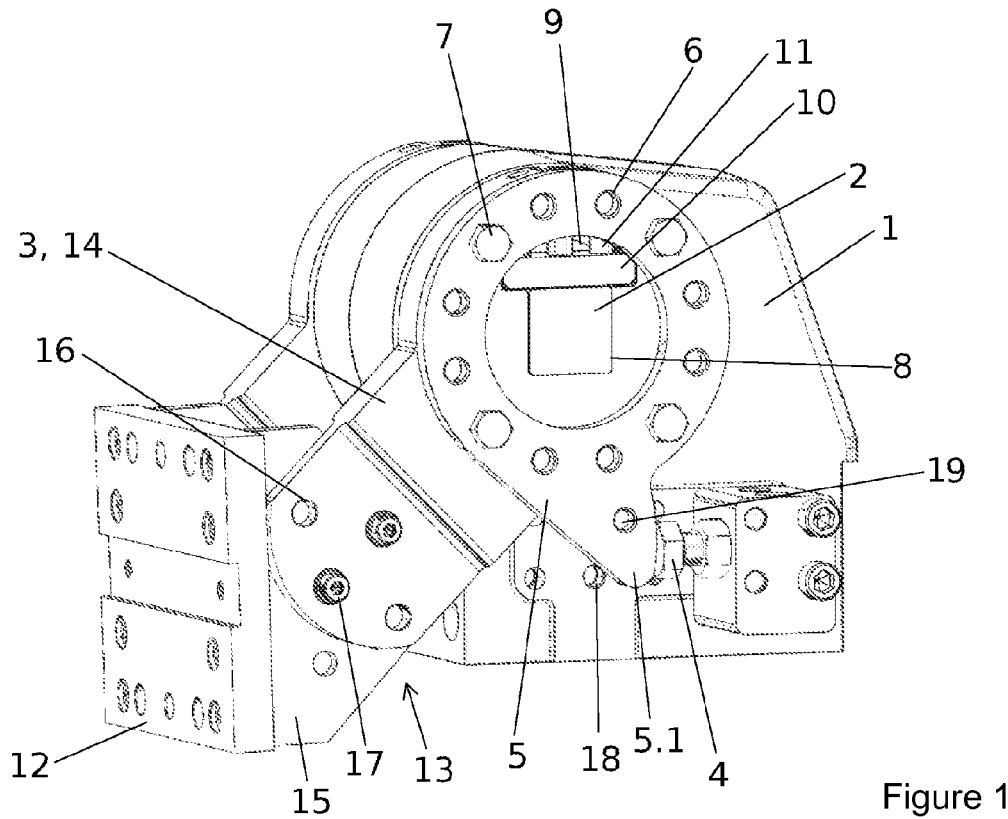
FIG. 1 is a perspective view of a swivel device with the second part of the stop detachable and reattachable in various positions on the swivel lever.

The swivel device represented in FIGS. 1 to 7 includes a swivel shaft 2, typically a square shaft, rotatably mounted in a housing 1. The ends of the swivel shaft 2 projects from the housing 1. A swivel lever 3, mounted on the shaft 2, can be swivelled relative to the housing 1. The swivel lever 3 is arranged outside the housing 1 such that it cannot rotate relative to the shaft 2.

A first part of the stop 4 is arranged externally on the housing 1. A second part of the stop 5 is connected with the swivel lever 3. The first and second parts 4, 5 form a rotational movement stop for the swivel lever 3.

As is already of known art from the above prior art, the housing 1 of the inventive swivel device is designed as a swivel device head with a drive that is connected to it, the latter is not represented since it is known in the arts. Here the drive can be designed as a hydraulic drive or a pneumatic drive with a so-called cam control system, or a toggle lever mechanism. In the present solution it is particularly preferable for the drive to be designed as an electric rotary drive with a worm gear transmission between the electric motor and the swivel shaft.

The second part of the stop 5 is designed to be detached from the swivel lever 3. The second stop part 5 is reattached in various positions on the swivel lever 3. The advantages that ensue as a result can be discerned directly from the figures.

While different swivel levers were previously required for different stop scenarios, now a single swivel lever is able to meet diverse stop requirements. Accordingly it is simply provided to detach the second part of the stop from the swivel lever and reattach in another position on the swivel lever.

The swivel lever 3 is provided with threaded holes. The second part of the stop 5 is provided with through holes 6 that are at least partly aligned with the threaded holes. The swivel lever 3 and the second part of the stop 5 are connected with one another via screws 7. The screws pass through the through holes 6 and engage in the threaded holes.

The second part of the stop 5 is designed as a flat plate with a projection 5.1. The projection 5.1 interacts with the first part of the stop 4. The second, plate-shaped, part of the stop 5 is designed such that either of its large surfaces can be attached to the swivel lever 3. Thus, depending upon the requirement placed on the stop, sometimes one of its sides can be screwed onto the swivel lever 3, and sometimes the other side. Here the second part of the stop 5 is optionally designed either as a circular disk, or in the form of a ring, with the nose-shaped projection 5.1. The second part of the stop 5 has, apart from the projection 5.1 interacting with the first part of the stop 4, at least partly the same external contour as the swivel lever 3 as seen in FIG. 1. The threaded holes and the through holes 6 are distributively arranged over the entire periphery on the swivel lever 3 and the second part of the stop 5. Thus, the two parts can be arranged relative to one another displaced through 360° (and more). Preferably the projection 5.1 is asymmetrically designed. Thus, the second part of the stop 5 can be used both as a stop for a rotational movement in the clockwise direction and also as a stop for a rotational movement in the counter-clockwise direction.

FIGS. 1 to 6 illustrate an embodiment of the swivel device. Here, the first part of the stop 4 is arranged on the housing 1 to prevent a rotational movement of the swivel lever 3 in a first direction of rotation.

Figure 7:
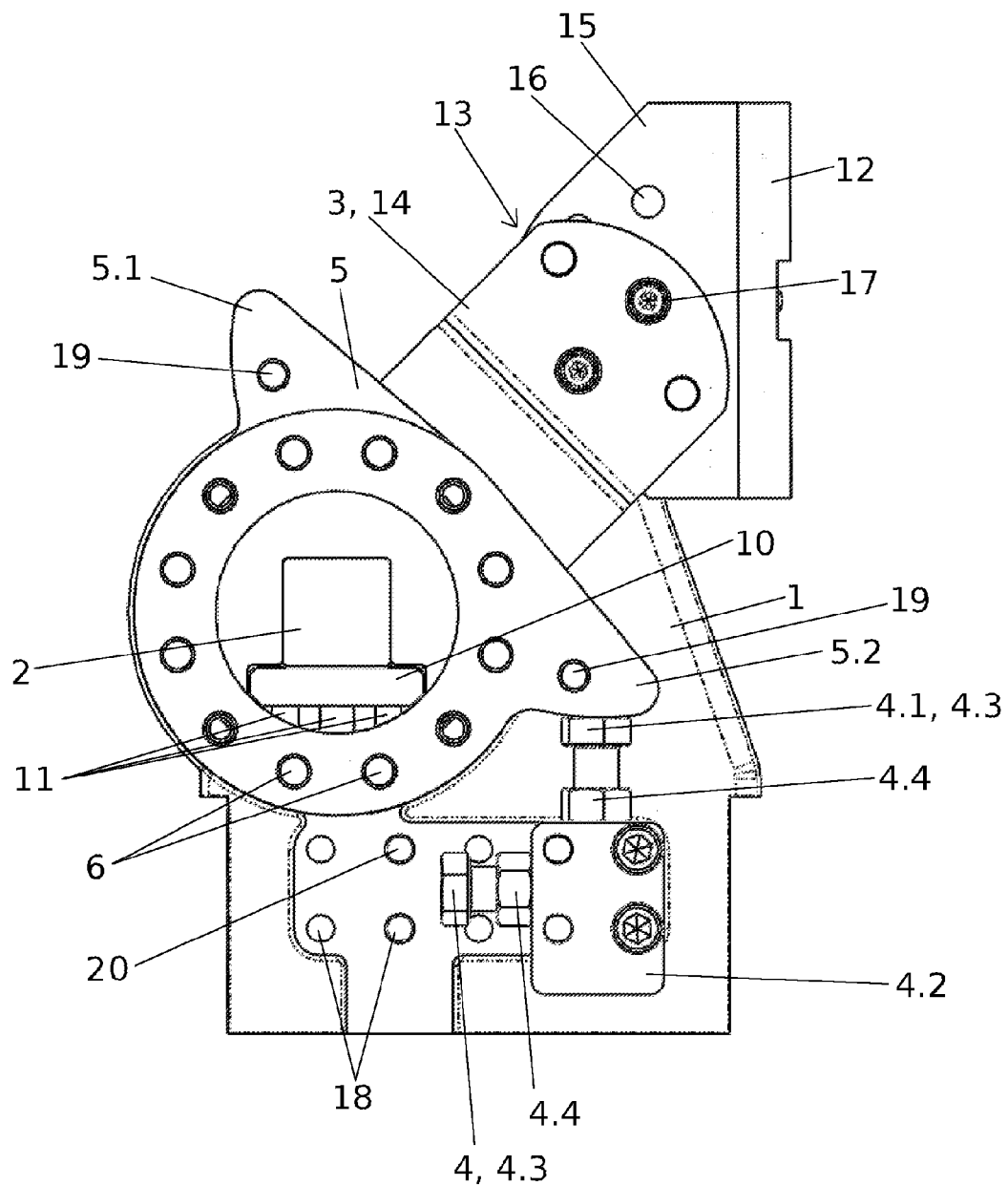
FIG. 7 is a side view of the swivel device with two first and two second parts of the stop.

In FIG. 7, an additional first part of the stop 4.1 is provided on the housing 1. The first part of the stop 4.1 interacts with an additional second part of the stop 5.2 attached to the swivel lever 3. Thus, the swivel device is designed to prevent a rotational movement of the swivel lever 3 in a second direction of rotation. Here the second part of the stop 5 and the additional second part of the stop 5.2 are preferably designed to be structurally identical. FIG. 7 shows an arrangement option where the second part of the stop 5.1 is provided as a stop for rotational movement in the counter-clockwise direction. The additional second part of the stop 5.2 is provided as a stop for a rotational movement in the clockwise direction. As explained earlier above, the additional second part of the stop 5.2 just has to be mounted on the swivel lever 3, the other way around, relative to the second part of the stop 5. Thus, as can be seen, a sandwich-type assembly is preferred. The parts of the stop 5, 5.2 are simply positioned one upon the other.

The first part of the stop 4 and an additional first part of the stop 4.1, forming a common stop block 4.2, are arranged externally on the housing 1. Here threaded holes 18 are provided on the housing 1 to attach either the first part of the stop 4, or the stop block 4.2. The first part of the stop 4 and an additional first part of the stop 4.1 are arranged at right angles to one another on the stop block 4.2.

An adjustment screw 4.3 enables accurate adjustment and corresponding fixing of the adjustment position. In FIGS. 1 to 7, the first part of the stop 4 and/or the additional first part of the stop 4.1 includes the adjusting screw 4.3 with an abutment head to contact the second part of the stop 5 and/or the additional second part of the stop 5.2. Also, the first part of the stop 4 and/or the additional first part of the stop 4.1 include a locknut 4.4. The locknut 4.4 locks the adjusting screw 4.3 in position. Further, the locknut 4.4 can be tensioned against the stop block 4.2.

The swivel device furthermore has a particular form of attachment of the swivel lever onto the swivel shaft.

A first opening 8 is provided on the swivel lever 3. The first opening 8 provides a form fit accommodation for the swivel shaft 2. A second opening 9 is provided for a clamping element 10. The clamping element 10 can be adjusted relative to the swivel lever 3 and can be tensioned against a flank of the swivel shaft 2. At least one tensioning screw 11 is provided to tension the clamping element 10 against the swivel shaft 2. The at least one tensioning screw 11 can be actuated from outside the swivel lever 3. The clamping element 10 is preferably designed in the form of a beam. The clamping element 10 is arranged between the swivel shaft 2 and the tensioning screw 11. The tensioning screw is mounted such that it can be rotated in a thread on the swivel lever 3. The tensioning screw 11 is preferably designed as a so-called grub screw. The tensioning screw 11 can be actuated with a screwdriver or an Allen key from outside the swivel lever 3.

The swivel shaft 2 is designed such that it projects out of the housing 1 on either side. The swivel lever 3 is formed from two swivel arms 13 arranged on either side of the housing 1. In each case, the two swivel arms 13 are connected with the swivel shaft 2 and with one another, via a mounting plate 12.

Each swivel arm 13 includes two arm parts 14 and 15. The arm parts 14, 15 are designed such that they can be connected securely with one another in various positions. Here the arm parts 14, 15, in each case, have a hole pattern with through holes and threaded holes 16. The through holes and threaded holes are aligned with one another at least partly in various positions. The through holes and threaded holes are designed such that they are connected with one another with screws 17. The mounting plate 12 is designed to be securely, but detachably, connected with the swivel arms 13. The mounting plate 12 has a hole pattern for purposes of attaching devices that are to be swivelled.

As can be seen from the figures, the two part swivel arm has the advantage that the mounting plate 12 can be attached to the swivel arm 13 depending upon the particular application. A store of different swivel arms 13, with mounting plates 12 variously arranged thereon, can thus be eliminated.

Another advantageous development of the swivel device, see in particular FIG. 7, is that a first reference element 19 is provided on the nose-shaped projection 5.1 on either the second part of the stop 5 or the additional second part of the stop 5.2. The first reference element 19, in a certain rotational position of the swivel shaft 2, is designed to be aligned with a second reference element 20 arranged on the housing 1.

The first reference element 19 is preferably designed as a through hole, with a thread. The second reference element 20 is preferably designed as a hole, with a thread.

Figure 2:
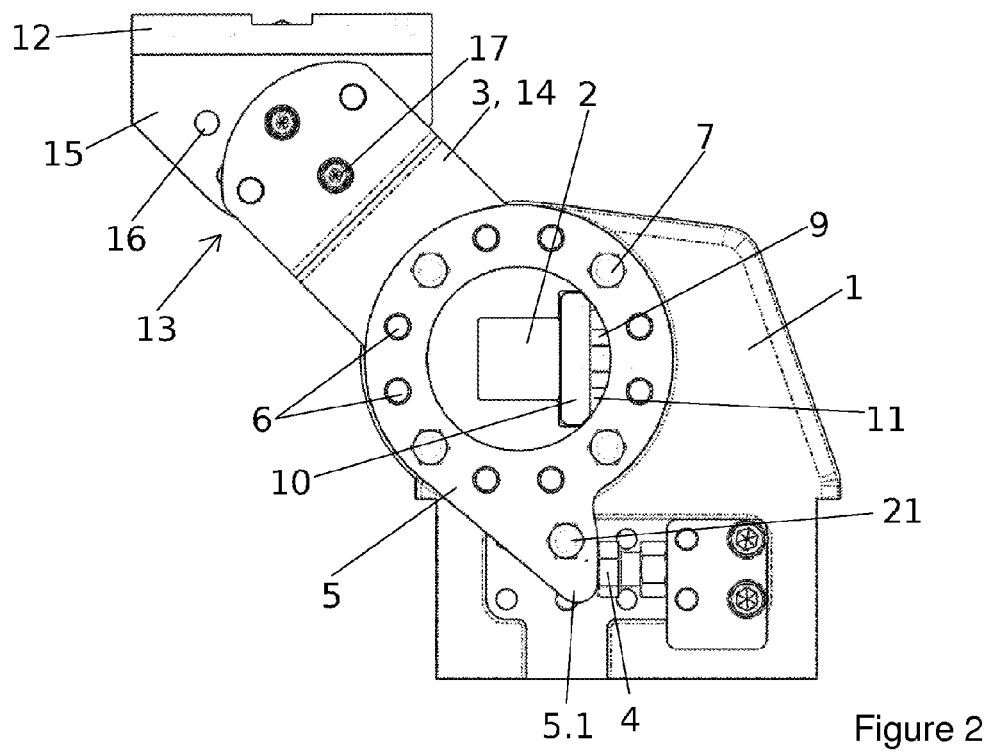
FIG. 2 is a side view of the device in accordance with FIG. 1 in another position of the swivel lever with a differently arranged second part of the stop.
Figure 3:
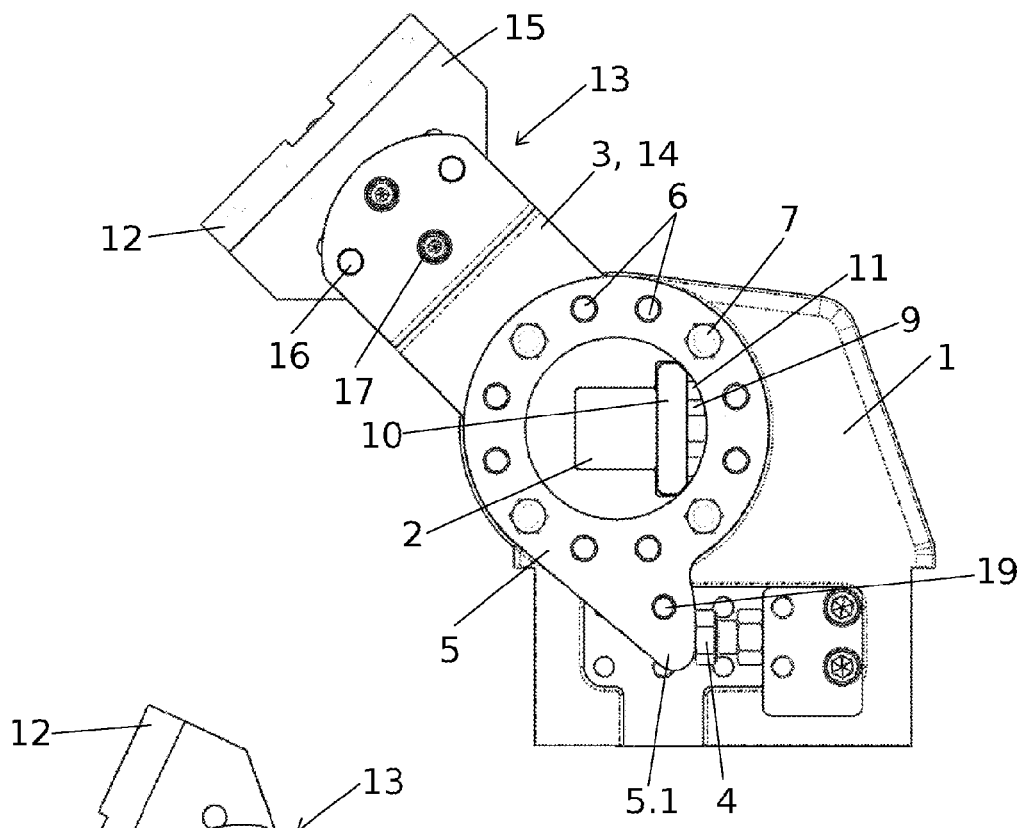
FIG. 3 is a side view of the swivel device in accordance with FIG. 2 in a first alternative arrangement of the parts of the swivel arm relative to one another.
Figure 4:
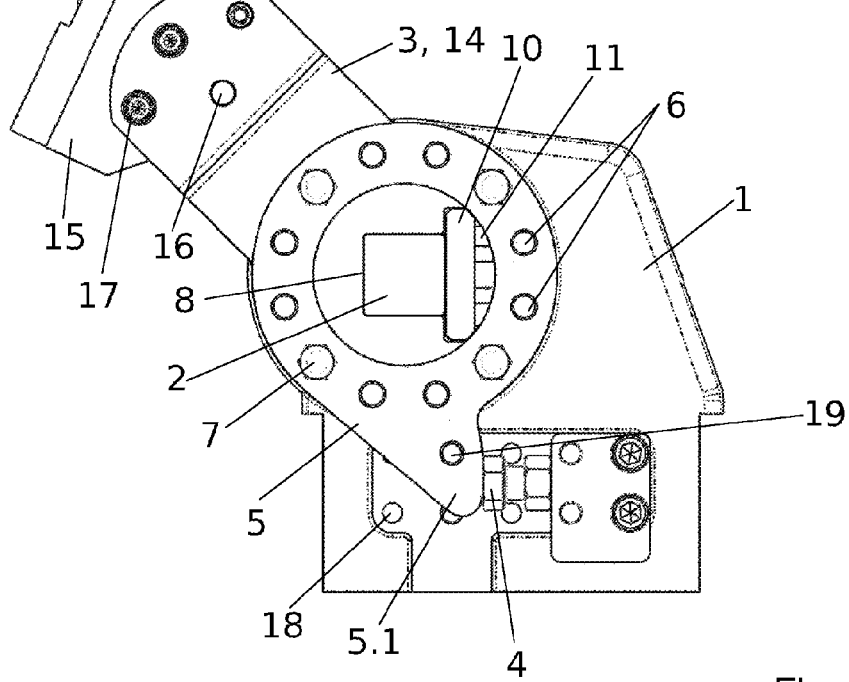
FIG. 4 is a side view of the swivel device in accordance with FIG. 2 in a second alternative arrangement of the parts of the swivel arm relative to one another.
Figure 5:
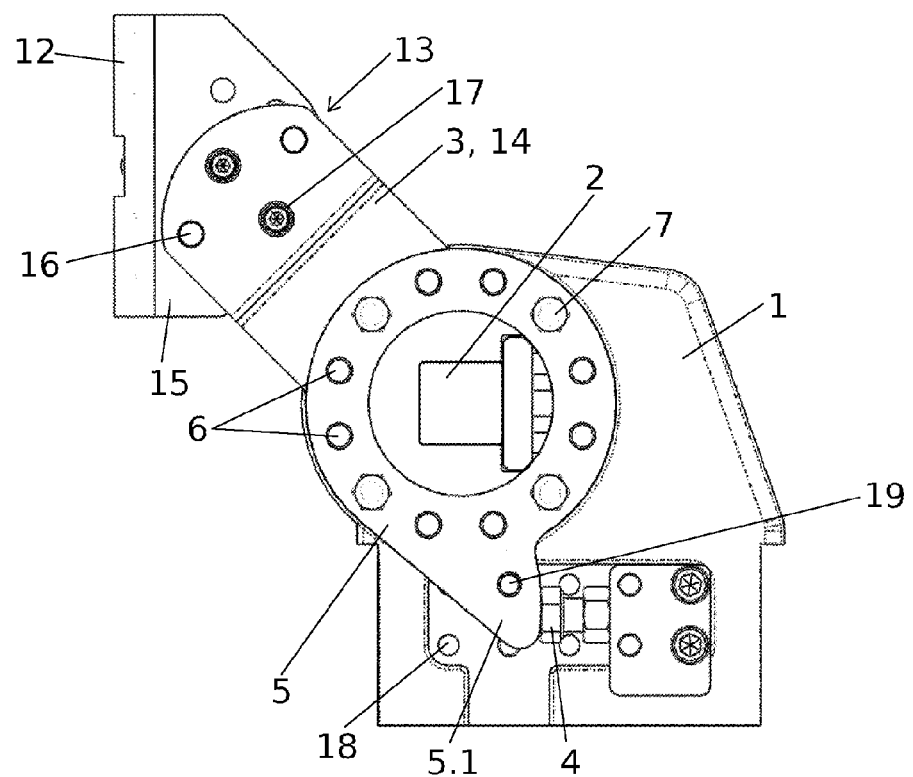
FIG. 5 is a side view of the swivel device in accordance with FIG. 2 in a third alternative arrangement of the parts of the swivel arm relative to one another.
Figure 6:
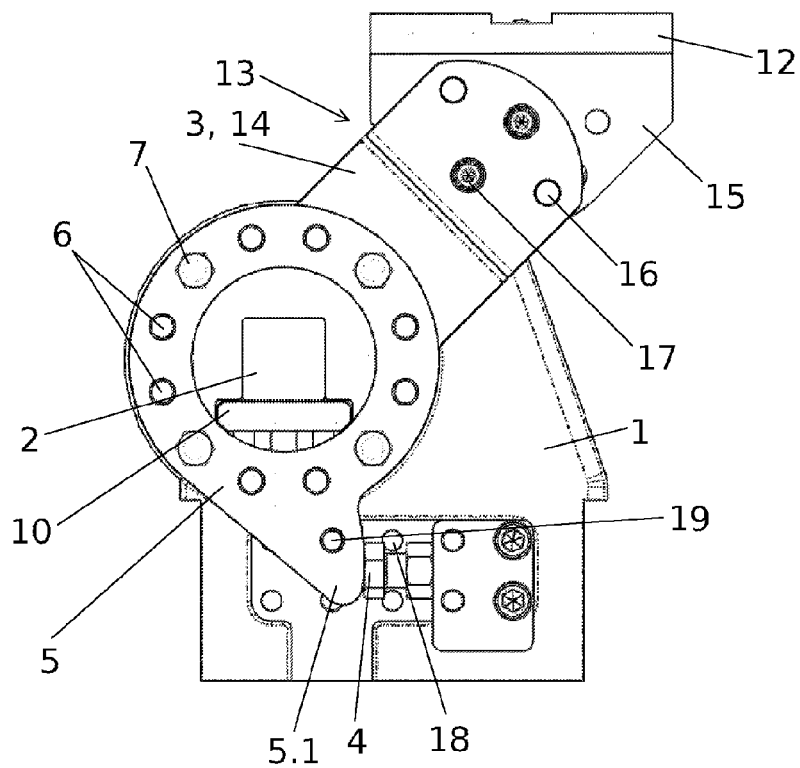
FIG. 6 is a side view of the device in accordance with FIG. 5 in another position of the swivel lever and with a differently arranged second part of the stop.

As represented in FIG. 2, the reference elements 19, 20 are designed such that they can be fixed to one another via a screw 21. This prevents a rotational movement of the swivel shaft 2. The screw 21 is provided to connect the first and second reference elements 19, 20.

The two reference elements 19, 20 have two functions.

The swivel device can be adjusted by the reference elements 19, 20 together with the actual attachment position of the second part of the stop 5, or the additional second part of the stop 5.2, on the swivel lever 3. Thus the exact position of the swivel lever 3 is known to, or can be communicated to, the control system.

The connection of the two reference elements 19, 20 by the screw 21 ensures, for example during the conversion of a production line, that the swivel lever 3 can no longer move.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The invention claimed is:

1. A swivel device, comprising:
 a swivel shaft rotatably mounted in a housing, opposing ends of the swivel shaft projecting outward on opposing sides of the housing;
 a swivel lever mounted on the shaft for rotation with the shaft, wherein the swivel lever is swiveled relative to the housing about a rotational axis of the swivel shaft, the swivel lever comprising two swivel arms arranged on the opposing sides of the housing, a first end of each swivel arm comprising a first opening in form fit accommodation with a respective end of the swivel shaft and having an outer periphery with a first circumferentially spaced array of mounting apertures disposed within an outer radial face thereof, and second ends of the swivel arms being connecting with one another;
 a first part of a stop is arranged externally on the housing, the first part of the stop being fixed to an exterior of the housing and the first part of the stop including an adjustment member adjustably protruding from the first part of the stop; and
 a second part of the stop comprising a portion shaped so that it is radially spaced from and disengaged from the swivel shaft and the shaped portion having an outer periphery with a nose-shaped projection that interacts with the adjustment member of the first part of the stop, and the second part of the stop shaped portion comprising a second circumferentially spaced array of mounting apertures extending through opposing inner and outer radial faces thereof, the second array of mounting apertures at least partly aligned with the first array of mounting apertures and the second part of the stop being connected with the swivel lever via fasteners that pass through the first and second array of mounting apertures, respectively, of a respective one of the swivel arms such that the second part of the stop shaped portion is directly connected to the swivel lever, the nose-shaped projection contacting an abutment head of the adjustment member to form a rotational movement stop for the swivel lever;
 wherein the second part of the stop is detachable from the swivel lever periphery and is reattachable to the swivel lever periphery in various angular positions on the swivel lever.

2. The swivel device in accordance with claim 1, wherein the second part of the stop shaped portion is a flat plate.

3. The swivel device in accordance with claim 1, wherein the first array of mounting apertures include threaded holes, and the fasteners comprise screws that pass through the second array of mounting apertures and engage in the threaded holes.

4. The swivel device in accordance with claim 1, wherein the second part of the stop shaped portion is either a circular disk or a ring.

5. The swivel device in accordance with claim 1, wherein the first part of the stop is arranged on the housing to prevent a rotational movement of the swivel lever in a first rotational direction, and an additional first part of the stop is provided on the housing, the additional first part of the stop interacts with an additional second part of the stop attached to the swivel lever, and the additional first and second parts of the stop prevent a rotational movement of the swivel lever in a second rotational direction.

6. The swivel device in accordance with claim 5, wherein the first part of the stop and the additional first part of the stop are arranged as a common stop block externally on the housing.

7. The swivel device in accordance with claim 1, further comprising a second opening provided in the swivel lever for a clamping element, the clamping element is adjustable relative to the swivel lever, and the clamping element can be tensioned against a flank of the swivel shaft.

8. The swivel device in accordance with claim 7, wherein at least one tensioning screw is provided for tensioning of the clamping element against the swivel shaft, the tensioning screw can be actuated from outside the swivel lever.

9. The swivel device in accordance with claim 1, wherein each swivel arm includes two arm parts that can be securely connected with one another in various positions.

10. The swivel device in accordance with claim 9, wherein the arm parts in each case have a hole pattern with through holes and threaded holes, wherein the through holes and threaded holes are at least partly aligned with one another in various positions, and the holes are connected with one another with screws.

11. The swivel device in accordance with claim 1, wherein a first reference element is provided on a nose-shaped projection of the part on the second part of the stop and/or on an additional second part of the stop and the first reference element is aligned in a certain rotational position of the swivel shaft with a second reference element arranged on the housing.

12. The swivel device in accordance with claim 11, wherein the reference elements can be fixed relative to one another so as to prevent a rotational movement of the swivel shaft.

13. The swivel device in accordance with claim 11, wherein the first reference element is a through hole with a thread.

14. The swivel device in accordance with claim 11, wherein the second reference element is a hole with a thread.

15. The swivel device in accordance with claim 11, wherein a screw connects the first and second reference elements.

* * * * *